US012508880B2

(12) United States Patent
Choi et al.

(10) Patent No.: US 12,508,880 B2
(45) Date of Patent: Dec. 30, 2025

(54) VEHICLE AIR-CONDITIONING APPARATUS

(71) Applicants:Hyundai Motor Company, Seoul (KR); Kia Corporation, Seoul (KR); Hanon Systems, Daejeon (KR)

(72) Inventors: Jae Sik Choi, Suwon-si (KR); Byeong Moo Jang, Suwon-si (KR); Young Tae Song, Gwangmyeong-si (KR); Sung Been Cheon, Daejeon (KR); Jin Uk Kim, Daejeon (KR); Jong Su Kim, Daejeon (KR); In Keun Kang, Daejeon (KR); Sang Chul Byun, Daejeon (KR)

(73) Assignees: Hyundai Motor Company, Seoul (KR); Kia Corporation, Seoul (KR); Hanon Systems, Daejeon (KR)

( * ) Notice: Subject to any disclaimer, the term of this patent is extended or adjusted under 35 U.S.C. 154(b) by 586 days.

(21) Appl. No.: 17/978,787

(22) Filed: Nov. 1, 2022

(65) Prior Publication Data

US 2023/0331071 A1      Oct. 19, 2023

(30) Foreign Application Priority Data

Apr. 14, 2022   (KR) .......................... 1020220046473

(51) Int. Cl.
 *B60H 3/06*     (2006.01)
 *B01D 46/00*    (2022.01)
(52) U.S. Cl.
 CPC ....... *B60H 3/0616* (2013.01); *B01D 46/0006* (2013.01); *B01D 46/0043* (2013.01);
 (Continued)

(58) Field of Classification Search
 CPC .... B60H 2003/065; B60H 2001/00621; B60H 1/00521; B60H 3/0608; B60H 3/0641;
 (Continued)

(56) References Cited

U.S. PATENT DOCUMENTS

| 6,280,316 B1 | 8/2001 | Loup |
| 2017/0095761 A1* | 4/2017 | Knight .................. B01D 46/12 |
| 2017/0136852 A1 | 5/2017 | Ishii et al. |

FOREIGN PATENT DOCUMENTS

| EP | 1902878 A1 | 3/2008 |
| JP | 2000247142 A | 9/2000 |

(Continued)

OTHER PUBLICATIONS

Joe Terrell, Ultimate Strut Bars Guide, Aug. 16, 2021, drifted.com, (Year: 2021).*

*Primary Examiner* — Jennifer Dieterle
*Assistant Examiner* — Qianping He
(74) *Attorney, Agent, or Firm* — Fish & Richardson P.C.

(57) ABSTRACT

A vehicle air-conditioning apparatus includes a filter case configured to accommodate a filter, and a filter cover configured to couple to an open upper end of the filter case. The filter case defines an inner space configured to accommodate the filter therein and having the open upper end to receive and discharge the filter therethrough. The inner space is inclined with respect to a vertical direction to allow the filter to be received into and discharged from the filter case in an inclined state. The filter cover includes a fixing protrusion protruding from a lower surface of the filter cover facing the inner space of the filter case and being configured to press and fix the filter in the inner space.

19 Claims, 6 Drawing Sheets

(52) U.S. Cl.
CPC ....... _B60H 3/0641_ (2013.01); _B01D 2265/02_ (2013.01); _B01D 2273/30_ (2013.01); _B01D 2277/20_ (2013.01); _B01D 2279/50_ (2013.01)

(58) Field of Classification Search
CPC ........ B60H 3/0658; B60H 2001/00635; B60H 3/0616; B01D 46/0006; B01D 46/0002; B01D 2277/20; B01D 46/0004; B01D 2279/50; B01D 46/2422; B01D 46/0043; B01D 2265/02; B01D 2273/30; F04D 17/10; F02M 35/0203; F24F 13/28
USPC ......................................................... 55/418
See application file for complete search history.

(56) References Cited

FOREIGN PATENT DOCUMENTS

| | | | | |
|---|---|---|---|---|
| JP | 2008285080 | A | 11/2008 | |
| JP | 2013136259 | A | 7/2013 | |
| JP | 2017136907 | A * | 8/2017 | |
| JP | 6544729 | B2 | 7/2019 | |
| KR | 100735906 | B1 | 7/2007 | |
| KR | 20090066421 | A | 6/2009 | |
| KR | 20110137447 | A | 12/2011 | |
| KR | 101418852 | B1 * | 7/2014 | ......... B60H 1/00521 |
| KR | 20210103612 | A | 8/2021 | |

* cited by examiner

VEHICLE AIR-CONDITIONING APPARATUS

CROSS-REFERENCE TO RELATED APPLICATION(S)

This application is based on and claims priority under 35 U.S.C. 119 to Korean Patent Application No. 10-2022-0046473, filed on Apr. 14, 2022, in the Korean Intellectual Property Office, the disclosure of which is herein incorporated by reference in its entirety.

TECHNICAL FIELD

The present disclosure relates to a vehicle air-conditioning apparatus including a filter case that is disposed in a blower unit and defines an inner space configured to receive a filter therein. The inner space of the filter case is inclined with respect to a vertical direction such that, when a filter is attached/detached, the filter can be replaced without interference with an overlying vehicle component.

BACKGROUND

Filters of cars are configured to remove impurities from external air flowing into air-conditioning apparatuses. The filters can filter impurities and the like from air, and reduce noise from inflowing air. In some cases, when the filters accumulate foreign matters over a long period of use, the filters may be replaced periodically.

In some examples, filters may be installed on blower units of car air-conditioning apparatuses and positioned behind blower motors of blower units. Recently produced eco-friendly vehicles (for example, electric cars) may dispense with engines positioned on front parts of vehicle dash panels, and blower units may be repositioned from the indoor spaces to front parts of dash panels, thereby changing the filter position. In some cases, where blower winds flow in the vertical direction of vehicles, filters may be attached/detached in the horizontal direction of vehicles. In some cases, where blower winds flow in the longitudinal direction of vehicles, filters may be attached/detached in the vertical direction of vehicles.

In some examples, filter installation directions may vary depending on the component layout of dash panel front parts of vehicles. If flower winds are made to flow in the vertical direction of vehicles, blower units may overlap and interfere with vehicle components, thereby making it difficult to configure packages. In some cases, components of front parts of vehicle dash panels may be configured such that blower winds are made to flow in the longitudinal direction of vehicles.

In some cases, where filters are disposed in the vertical direction of vehicles such that blower winds flow in the longitudinal direction in the outdoor space of dash panel front parts of vehicles, there is a problem in that, when filters are attached/detached, the filters may interfere with overlying vehicle components (for example, strut bars), which limits efficient filter repair.

SUMMARY

The present disclosure describes a vehicle air-conditioning apparatus and, more particularly, a vehicle air-conditioning apparatus having an inner space configured to accommodate a filter therein, where the inner space is inclined with respect to a vertical direction such that, when the filter is attached/detached, interference with overlying vehicle components can be avoided, and the filter can be repaired efficiently.

According to one aspect of the subject matter described in this application, a vehicle air-conditioning apparatus is configured to be provided to a vehicle, where the vehicle includes a dash panel that extends in a vertical direction and partitions a space of the vehicle into an outdoor space and an indoor space defined rearward relative to the outdoor space. The vehicle air-conditioning apparatus includes a blower disposed in the outdoor space, a filter case that is disposed at the blower and defines an inner space configured to accommodate a filter therein, where the inner space has an open upper end configured to receive and discharge the filter therethrough, and the inner space is inclined with respect to the vertical direction to thereby allow the filter to be received into and discharged from the filter case in an inclined state. The vehicle air-conditioning apparatus further includes a filter cover disposed above the filter case and configured to be coupled to the open upper end of the filter case, where the filter cover includes a fixing protrusion that protrudes from a lower surface of the filter cover facing the inner space of the filter case and is configured to press and fix the filter in the inner space of the filter case.

Implementations according to this aspect can include one or more of the following features. For example, a width of a lower end of the inner space of the filter case can correspond to a width of the filter. In some examples, a width of an upper end of the inner space of the filter case can be greater than the width of the filter. In some examples, a width of the inner space of the filter case can increase from a lower end of the filter case to an upper end of the filter case.

In some implementations, the inner space of the filter case can extend along the vertical direction and is inclined toward a front of the vehicle relative to the dash panel. In some implementations, the vehicle includes a strut bar disposed above the blower and spaced apart from the blower, where the strut bar is disposed above the filter case, and the filter case can be configured to receive and discharge the filter through the open upper end without interfere between the filter and the strut bar.

In some implementations, the fixing protrusion can be configured to press the filter rearward toward the indoor space and into the inner space of the filter case. In some examples, the filter case can be configured to, based on the filter cover being separated from the filter case, allow the filter to move forward along the inner space of the filter case and then pulled through the open upper end of the filter case.

In some implementations, the fixing protrusion can extend from the lower surface of the filter cover facing the inner space of the filter case, where the fixing protrusion includes an inclined surface that defines a width of the fixing protrusion that decreases toward a lower end of the fixing protrusion. In some examples, the fixing protrusion can further include a front surface that extends from the lower surface of the filter cover to the lower end of the fixing protrusion and is disposed forward relative to the inclined surface, where the width of the fixing protrusion is defined based on a distance between the front surface and the inclined surface of the fixing protrusion.

In some implementations, the fixing protrusion can have a lower end that is round and configured to be disposed in the inner space of the filter case. In some implementations, the fixing protrusion can be one of a plurality of fixing protrusions that are arranged at the lower surface of the filter cover facing the inner space of the filter case, where the plurality of fixing protrusions are spaced apart from one another in a width direction of the filter cover. In some examples, the filter cover can further include a support that connects the plurality of fixing protrusions. In some examples, each of the plurality of fixing protrusions can have an inclined surface that extends from the support to a lower end of one of the plurality of fixing protrusions to thereby define a width of the one of the plurality of fixing protrusions that decreases toward the lower end.

In some implementations, the plurality of fixing protrusions can be disposed between an edge of the filter cover and the support. In some examples, the plurality of fixing protrusions can be configured to hold the filter between the support and another edge of the filter cover that faces the edge of the filter cover. In some implementations, the inner space of the filter case can be configured to be defined between a front inner surface of the filter case and a front side of the filter accommodated in the filter case.

In some examples, the front inner surface of the filter case can be configured to be inclined forward with respect to the front side of the filter. In some examples, the fixing protrusion can include a front surface that extends from the lower surface of the filter cover to a lower end of the fixing protrusion and is configured to face and contact the front inner surface of the filter case, and an inclined surface that extends from the lower surface of the filter cover to the lower end of the fixing protrusion and is configured to be spaced apart from the front side of the filter, where the inclined surface is disposed rearward relative to the front surface of the fixing protrusion and configured to face the front side of the filter.

In some examples, a width of the fixing protrusion can be defined based on a distance between the front surface and the inclined surface of the fixing protrusion, where the width of the fixing protrusion decreases toward the lower end of the fixing protrusion.

DETAILED DESCRIPTION

Figure 1:
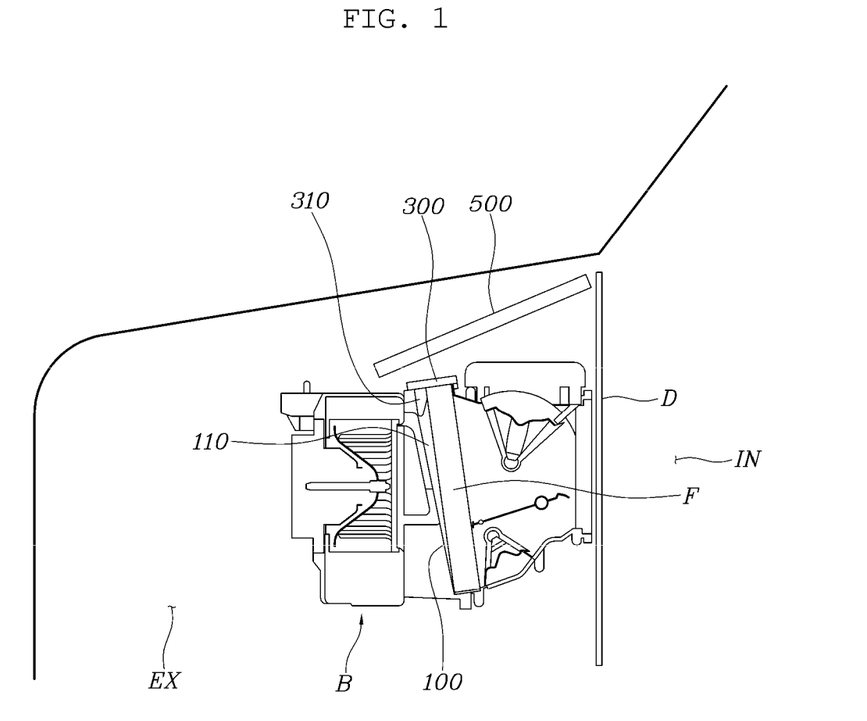
FIG. 1 is a sectional view illustrating an example of a vehicle air-conditioning apparatus installed in an outdoor space of a front part of a vehicle.
Figure 2:
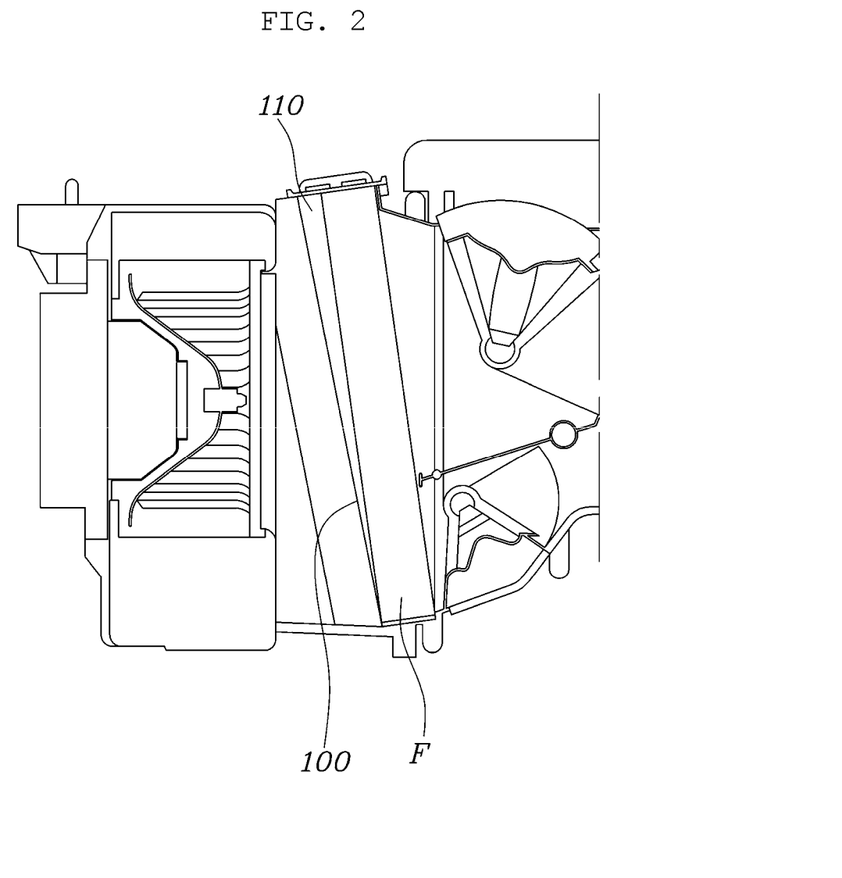
FIG. 2 is a cross-sectional view illustrating an example of a filter case provided in the vehicle air-conditioning apparatus.
Figure 3:
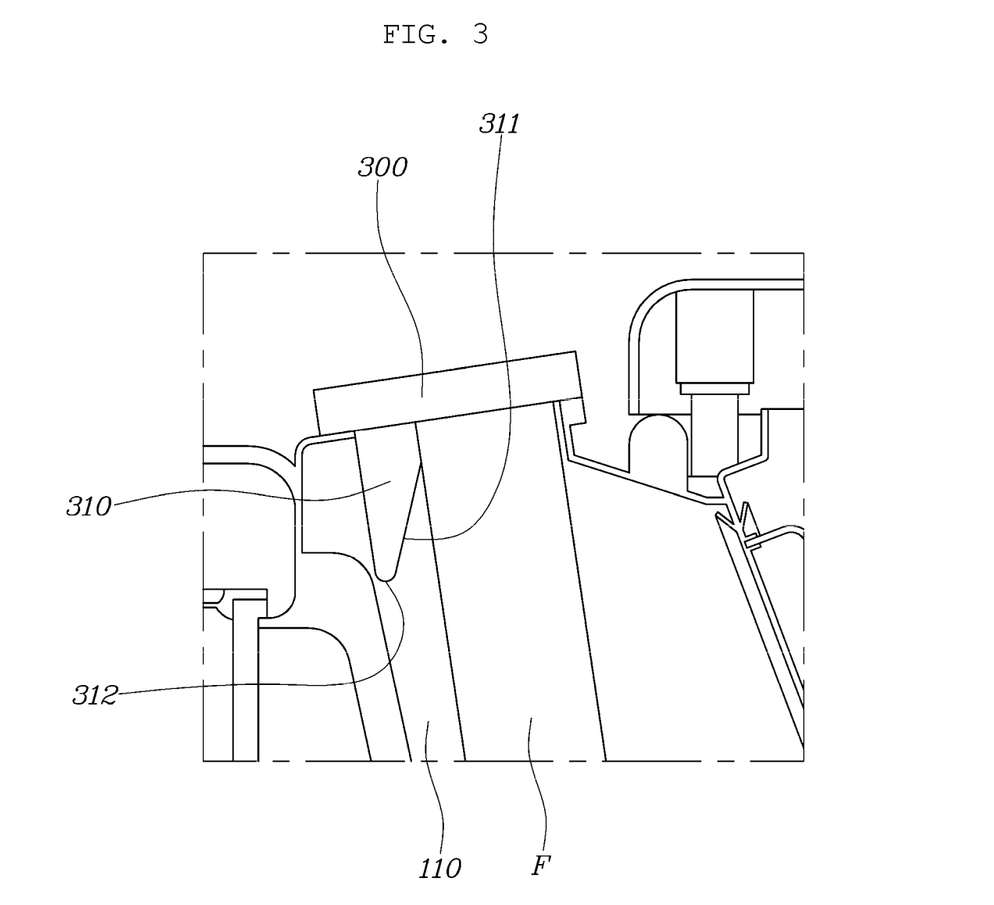
FIG. 3 is a cross-sectional view illustrating an example of a filter and a filter cover mounted to the filter case.
Figure 4:
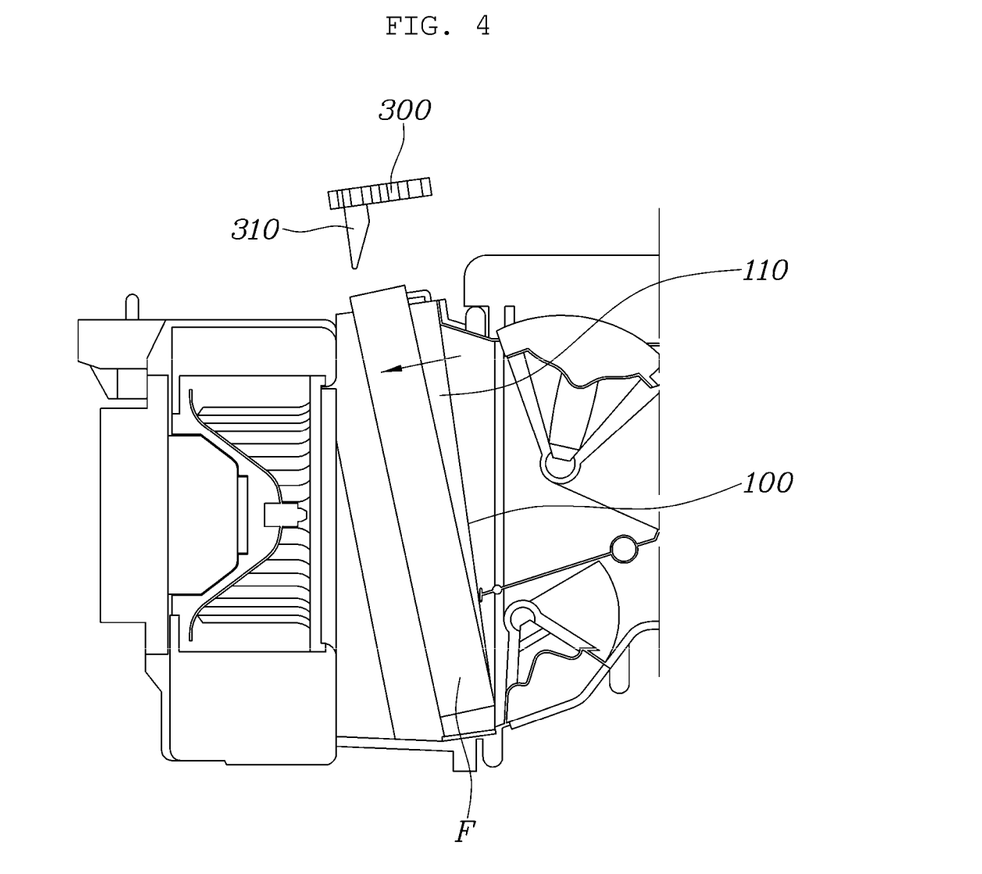
FIG. 4 to FIG. 5 are cross-sectional views showing an example of a process for removing a filter from the filter case after separating the filter cover from the filter case.
Figure 5:
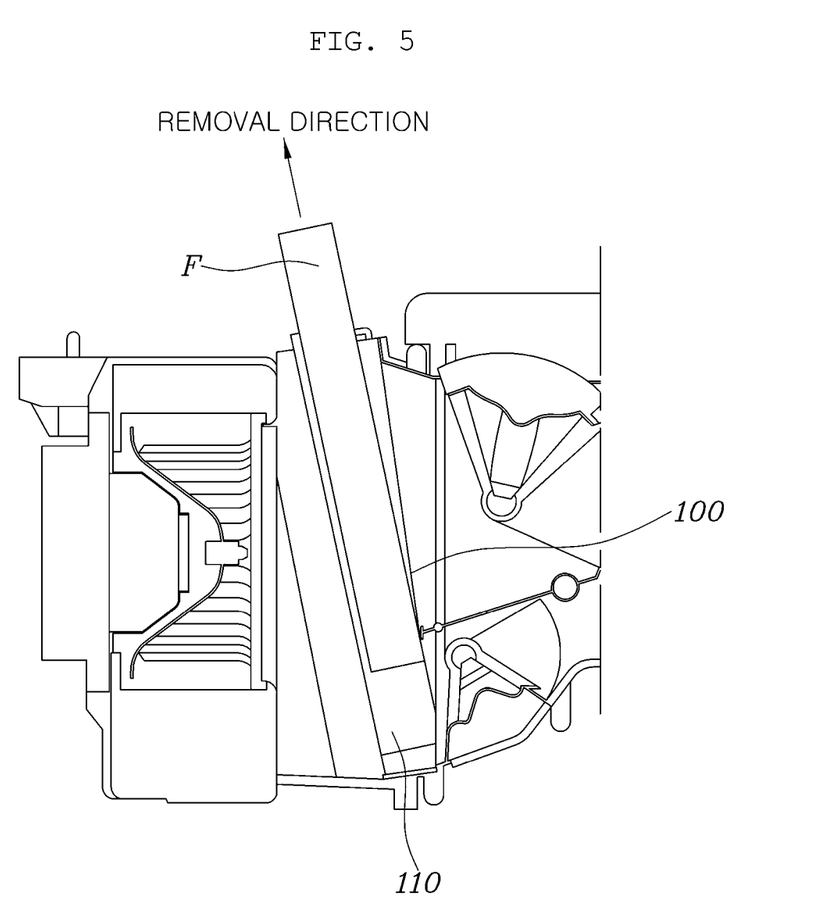
Figure 6:
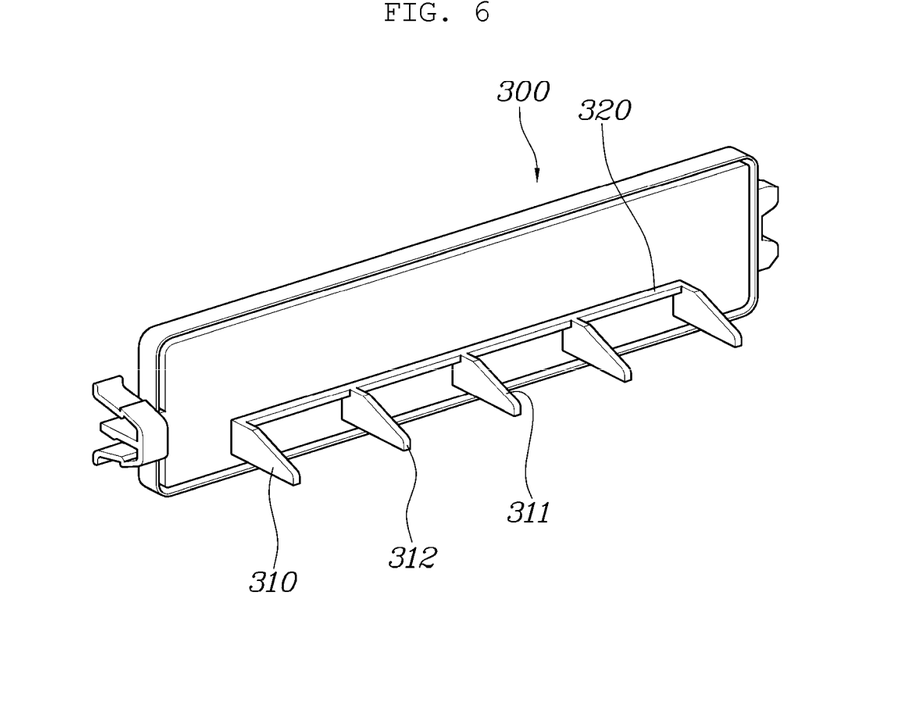
FIG. 6 is a perspective view illustrating an example of the filter cover.

FIG. 1 is a sectional view illustrating a vehicle air-conditioning apparatus installed in an outdoor space of a front part of a vehicle, FIG. 2 is a cross-sectional view illustrating an example of a filter case provided in the vehicle air-conditioning apparatus, FIG. 3 is a cross-sectional view illustrating an example of a filter and a filter cover mounted to the filter case, FIG. 4 to FIG. 5 are cross-sectional views showing an example of a process for removing a filter from the filter case after separating the filter cover from the filter case, and FIG. 6 is a perspective view showing an example of the filter cover.

A vehicle can have an engine room, in which an engine and the like are placed, in a front part of a vehicle. In some examples, in the case of eco-friendly vehicles such as electric vehicles, since there is no engine, an outdoor space EX of the front part thereof can be used for various purposes. In some cases, a vehicle air-conditioning apparatus can be mounted inside an instrument panel of an indoor space IN thereof. In some cases, the indoor space IN can be greatly reduced due to the site of the air-conditioning apparatus.

The present disclosure describes a vehicle air-conditioning apparatus that can utilize remaining spaces of an eco-friendly vehicle such as an electric vehicle and further secure the indoor space IN. For example, a vehicle air-conditioning apparatus can include a blower unit B provided in the outdoor space EX of the front part of a vehicle dash panel D.

In some implementations, FIG. 1 is a sectional view illustrating a vehicle air-conditioning apparatus installed in an outdoor space of the front part of a vehicle. The vehicle air-conditioning apparatus according to the present disclosure can include a filter case 100 which is disposed in the blower unit B provided in the outdoor space EX of the front part of the vehicle dash panel D. The filter case 100 defines an inner space 110 that is configured to receive a filter F therein and is formed in the vertical direction of a vehicle.

The inner space 110 can have an open upper end such that the filter F is detached or attached through the open upper end, and the inner space 110 can be inclined with respect to the vertical direction thereof such that the filter F is detached therefrom or attached thereto in an inclined state, thereby preventing the filter F from interfering with an overlying vehicle component when the filter is detached or attached.

The vehicle air-conditioning apparatus can further include a filter cover 300 which is coupled to the open upper end of the filter case 100 and has a fixing protrusion 310 formed on the lower end part of the inner surface thereof toward the inner space 110 of the filter case 100, thereby pressing and fixing the filter F in the inner space 110 of the filter case 100.

In some examples, the vehicle air-conditioning apparatus can be provided in the outdoor space EX of the front part of the vehicle dash panel D. Specifically, the vehicle air-conditioning apparatus can have a structure in which the filter F is detached or attached in the vertical direction of the vehicle since the wind of a blower flows in the longitudinal direction of a vehicle. That is, the blower unit can be mounted in the outdoor space EX of the front part thereof so as to be installed in more various directions, and the blower unit can be installed such that the wind of a blower flows in the longitudinal direction of a vehicle, thereby reducing the flow resistance thereof. In addition, in order to sufficiently filter air, a structure, in which filter is disposed in the vertical direction perpendicular thereto, can be provided therein.

In some cases, when the filter F is detached or attached in the vertical direction, interference with vehicle components positioned thereabove can occur. Therefore, difficulties may occur when the filter F is first mounted or a maintenance such as replacement is performed. Therefore, the inner space 110, in which the filter F is mounted, can have an inclination such that the filter F is detached or detached without interference with vehicle components positioned there-above.

In some examples, where the inner space 110, in which the filter F is mounted, is changed, the shape of the filter cover 300 can also be changed. If the filter F is not fixed but moves freely in the inner space 110 having an inclination, the filter F may not function properly when a vehicle is driving. Therefore, in the case, the fixing protrusion 310 can be provided on the filter cover 300 and configured to press the filter such that the filter F is fixed at a rear mounting position of the inner space 110 without a movement in a state being mounted thereto.

FIG. 2 is a cross-sectional view showing an example of a filter case provided in the vehicle air-conditioning apparatus. In some implementations, as illustrated in FIG. 2, the width of the lower end of the inner space 110 of the filter case 100 can correspond to the width of the lower end of the filter F. When the filter F is inserted into the filter case 100, the filter F can move freely in the inner space 110. If a movement thereof is free even at the lower end of the filter case 100, it can be convenient to insert or remove the filter F.

In some examples, to address a problem in fixation when the filter F has been mounted at the rear mounting position of the inner space 110 of the filter case, the width of the lower end of the inner space 110 of the filter case is formed to correspond to the width of the lower end of the filter F so as to restrict a movement of the lower end part of the filter F when the filter F has been inserted.

When the width of the lower end of the inner space 110 of the filter case 100 is determined, the inner space 110 can be formed to have a width with gradually increasing toward the upper end with reference to the lower end. In order to easily insert or remove the filter F through the open upper end of the filter case 100, the width of the open upper end of the filter case 100 can be wider than the width of the upper end of the filter F.

In some examples, the inner space 110 of the filter case 100 can be configured to extend in the vertical direction and be inclined toward the front of a vehicle. In some cases, if only the width of the open upper end of the filter case 100 is widened without tilting the filter case 100, the insertion or removal of the filter F can become easy, but interference with vehicle components, which are positioned above the filter case 100, may occur. Therefore, in order to avoid interference with vehicle components positioned thereabove and in order for efficient maintenance thereof when detaching or attaching the filter F, the inner space 110 has a width with gradually increasing from the lower end to the upper end of the filter case 100, and the filter case 100 is inclined toward the front of a vehicle.

In some examples, as illustrated in FIG. 1, vehicle components above the filter case 100 can include a strut bar 500 provided to be spaced apart above the blower unit B as a representative example. Many components can be provided in the outdoor space EX of the front part of the vehicle dash panel D. In addition, the filter case 100 can be formed in the vertical direction of a vehicle, the filter F can be configured to be detached or attached in the vertical direction, and thus interference with vehicle components positioned above the filter case 100 can occur.

Particularly, in order to secure straightness while a vehicle is driving and to improve driving stability by minimizing left/right vibration at the time of turning, there is a type of a vehicle to which the strut bar 500 is mounted. The strut bar 500 can be mainly coupled above a wheel housing or to suspension mount close to the vehicle dash panel D. The position of the strut bar 500 can be different according to a type of a vehicle in which same is installed. The strut bar 500, which is installed above a position at which the filter F of the blower unit B is mounted, can be a major cause of interference which occurs when detaching or attaching the filter F. According to the present disclosure, the installation positions of vehicle components such as the strut bar 500 can be freely designed, and the maintainability of replacement of the filter F may not be compromised.

FIG. 3 is a cross-sectional view showing an example of a filter and a filter cover that are mounted to a filter case, where the filter F can be mounted in an inclined state. The fixing protrusion 310 can be provided on the inner surface of the filter cover 300 such that the filter F is firmly fixed therein. When the filter cover 300 is mounted, the fixing protrusion 310 can naturally press the filter F of the inner space 110 of the filter case backward to fix the position thereof.

FIG. 4 to FIG. 5 are cross-sectional views showing an example of a process for removing a filter from the filter case after separating the filter cover from the filter case. For example, as illustrated in FIG. 4, when the filter cover 300 is separated, the filter F is tilted after being tilted and moved forward in inner space 110 of the filter case. Thereafter, as illustrated in in FIG. 5, the filter can be removed through the open upper end of the filter case 100, and thus interference with the strut bar 500 can be prevented.

As illustrated in FIG. 3, the fixing protrusion 310 can be configured to press the filter F and thus to function as fixing the filter to the rear side of the inner space 110 of the filter case. In this case, the fixing protrusion 310 can be configured to have a form capable of fixing the filter F while pressing same without damage thereof. When the filter F and filter cover 300 have been mounted, the space, in which the fixing protrusion 310 is positioned, has a shape having a width gradually decreasing from the upper part to the lower part of the inner space 110 in accordance with the shape of the inner space 110 of the filter case 100. Therefore, the fixing protrusion 310 can have a shape in accordance with the shape of the space. Accordingly, the fixing protrusion 310 can be configured to extend downward from the inner surface of the filter cover 300 so as to have a shape having an inclined surface 311 and a decreasing width towards the extending end.

As illustrated in FIG. 3, the inclined surface 311 formed on the fixing protrusion 310 can be directed backward when the filter cover 300 is mounted. When the filter cover 300 is mounted, the filter F, which is positioned in the front of the inner space 110, can move naturally to the rear side by the fixing protrusion 310 having the inclined surface 311. Thereafter, the fixing protrusion 310 of the filter cover 300 can be positioned in the inner space 110 of the filter case 100 to fix the filter F such that the filter does not move.

In addition, as illustrated in FIG. 3, the lower end part 312 of the fixing protrusion 310 can be formed to be round. When the filter cover 300 is mounted or separated, the fixing protrusion 310 can come into contact with the filter F and thus can directly affect same. If the lower end part 312 of the fixing protrusion 310 is formed in an angular shape, the filter F can be damaged by the fixing protrusion 310 when the filter cover 300 is mounted or separated. Therefore, the lower end part 312 of the fixing protrusion 310 can be formed to be round, and thus the filter F can be not damaged by the fixing protrusion 310 when filter cover 300 is mounted or separated.

FIG. 6 is a perspective view showing an example of the filter cover. In some examples, as illustrated in FIG. 6, multiple fixing protrusions 310, which are spaced apart along the width direction of the filter cover 300, can be provided on the inner surface of the filter cover 300. The filter F, which is mounted to the blower unit B, can be formed in a rectangular parallelepiped having a predetermined thickness, length, and area.

In some cases, where the filter cover 300 has one fixing protrusion 310, it can be difficult to fix the filter F to the rear side of the inner space 110 of the filter case. Therefore, in some implementations, in order to fix the filter F, which can move in the inner space 110 of the filter case, to the rear side thereof, the multiple fixing protrusions 310 can be provided.

In some implementations, the multiple fixing protrusions 310 can be connected through a support member 320 formed on the filter cover 300 and thus can be integrated with each other. In addition, the support member 320 can be formed at a position corresponding to the width of the upper end part of the filter F. Therefore, the integrated multiple fixing protrusions 310 can be formed as one fixing member, and thus can press the filter F to the rear side of the inner space 110 of the filter case and then can fix same when the filter cover 300 is mounted. In addition, the support member 320 can be formed at a position corresponding to the width of the upper end part of the filter F, and thus doubly fix the filter F together with the fixing protrusions 310.

In some implementations, the indoor space, into which the filter is inserted, can be inclined with respect to the vertical direction, and thus the filter can be detached or attached without interference with vehicle components positioned thereabove, to thereby provide a space for efficient maintenance of the filter.

In addition, by the fixing protrusions on the filter cover, the filter can be firmly fixed at the rear mounting position of the indoor space inclined forward. Therefore, there is an effect in performance guarantee as well as in maintenance.

Although illustrated and described in connection with a specific implementation, it should be obvious to a person skilled in the art that the present disclosure can be variously modified and changed without departing from the technical idea, which is provided by the following claims.

What is claimed is:

1. A vehicle air-conditioning apparatus of a vehicle, the vehicle including a dash panel that extends in a vertical direction and partitions a space of the vehicle into an outdoor space and an indoor space defined rearward relative to the outdoor space, the vehicle air-conditioning apparatus comprising:
   a blower disposed in the outdoor space;
   a filter case that is disposed at the blower and defines an inner space configured to accommodate a filter therein, the inner space having an open upper end configured to receive and discharge the filter therethrough, wherein the inner space is inclined with respect to the vertical direction to thereby allow the filter to be received into and discharged from the filter case in an inclined state; and
   a filter cover disposed above the filter case and configured to be coupled to the open upper end of the filter case, the filter cover comprising a fixing protrusion that protrudes from a lower surface of the filter cover facing the inner space of the filter case and is configured to press and fix the filter in the inner space of the filter case,
   wherein the inner space of the filter case is configured to be defined between a front inner surface of the filter case and a front side of the filter accommodated in the filter case, and
   wherein the fixing protrusion comprises:
      a front surface that extends from the lower surface of the filter cover toward a lower end of the fixing protrusion and is configured to face and contact the front inner surface of the filter case, and
      an inclined surface that extends from the lower surface of the filter cover to the lower end of the fixing protrusion and is configured to be spaced apart from the front side of the filter, the inclined surface being disposed rearward relative to the front surface of the fixing protrusion and configured to face the front side of the filter.

2. The vehicle air-conditioning apparatus of claim 1, wherein a width of a lower end of the inner space of the filter case corresponds to a width of the filter.

3. The vehicle air-conditioning apparatus of claim 2, wherein a width of the open upper end of the inner space of the filter case is greater than the width of the filter.

4. The vehicle air-conditioning apparatus of claim 1, wherein a width of the inner space of the filter case increases from a lower end of the filter case to the open upper end of the filter case.

5. The vehicle air-conditioning apparatus of claim 1, wherein the inner space of the filter case extends along the vertical direction and is inclined toward a front of the vehicle relative to the dash panel.

6. The vehicle air-conditioning apparatus of claim 1, wherein the vehicle includes a strut bar disposed above the blower and spaced apart from the blower, the strut bar being disposed above the filter case, and
   wherein the filter case is configured to receive and discharge the filter through the open upper end without interfere between the filter and the strut bar.

7. The vehicle air-conditioning apparatus of claim 1, wherein the fixing protrusion is configured to press the filter rearward toward the indoor space and into the inner space of the filter case.

8. The vehicle air-conditioning apparatus of claim 1, wherein the filter case is configured to, based on the filter cover being separated from the filter case, allow the filter to move forward along the inner space of the filter case and then pulled through the open upper end of the filter case.

9. The vehicle air-conditioning apparatus of claim 1, wherein the inclined surface of the fixing protrusion defines a width of the fixing protrusion that decreases toward the lower end of the fixing protrusion.

10. The vehicle air-conditioning apparatus of claim 9, wherein the width of the fixing protrusion is defined based on a distance between the front surface and the inclined surface of the fixing protrusion.

11. The vehicle air-conditioning apparatus of claim 1, wherein the fixing protrusion has a lower end that is round and configured to be disposed in the inner space of the filter case.

12. The vehicle air-conditioning apparatus of claim 1, wherein the fixing protrusion is one of a plurality of fixing protrusions that are arranged at the lower surface of the filter cover facing the inner space of the filter case, the plurality of fixing protrusions being spaced apart from one another in a width direction of the filter cover.

13. The vehicle air-conditioning apparatus of claim 12, wherein the filter cover further comprises a support that connects the plurality of fixing protrusions.

14. The vehicle air-conditioning apparatus of claim 13, wherein each of the plurality of fixing protrusions has the inclined surface that extends from the support to a lower end of one of the plurality of fixing protrusions to thereby define a width of the one of the plurality of fixing protrusions that decreases toward the lower end.

15. The vehicle air-conditioning apparatus of claim 13, wherein the plurality of fixing protrusions are disposed between an edge of the filter cover and the support.

16. The vehicle air-conditioning apparatus of claim 15, wherein the plurality of fixing protrusions are configured to hold the filter between the support and another edge of the filter cover that faces the edge of the filter cover.

17. The vehicle air-conditioning apparatus of claim 1, wherein the front inner surface of the filter case is configured to be inclined forward with respect to the front side of the filter.

18. The vehicle air-conditioning apparatus of claim 1, wherein a width of the fixing protrusion is defined based on a distance between the front surface and the inclined surface of the fixing protrusion, the width of the fixing protrusion decreasing toward the lower end of the fixing protrusion.

19. A vehicle air-conditioning apparatus of a vehicle, the vehicle including a dash panel that extends in a vertical direction and partitions a space of the vehicle into an outdoor space and an indoor space defined rearward relative to the outdoor space, the vehicle air-conditioning apparatus comprising:
- a blower disposed in the outdoor space;
- a filter case that is disposed at the blower and defines an inner space configured to accommodate a filter therein, the inner space having an open upper end configured to receive and discharge the filter therethrough, wherein the inner space is inclined with respect to the vertical direction to thereby allow the filter to be received into and discharged from the filter case in an inclined state; and
- a filter cover disposed above the filter case and configured to be coupled to the open upper end of the filter case, the filter cover comprising a fixing protrusion that protrudes from a lower surface of the filter cover facing the inner space of the filter case and is configured to press and fix the filter in the inner space of the filter case, wherein a width of the inner space of the filter case increases from a lower end of the filter case to the open upper end of the filter case, and wherein the width of the inner space of the filter case at the open upper end of the filter case is greater than a width of the filter, wherein the open upper end of the filter case is located vertically higher than the lower end of the filter case.

* * * * *